(12) United States Patent
Lüscher et al.

(10) Patent No.: US 6,378,877 B1
(45) Date of Patent: Apr. 30, 2002

(54) APPARATUS FOR CLAMPING A WORK PIECE

(75) Inventors: Marcel Lüscher, Lenzburg; Karl Fries, Reinach, both of (CH)

(73) Assignee: Erowa AG, Reinach (CH)

( * ) Notice: Subject to any disclaimer, the term of this patent is extended or adjusted under 35 U.S.C. 154(b) by 0 days.

(21) Appl. No.: 09/611,469

(22) Filed: Jul. 7, 2000

(30) Foreign Application Priority Data

Jul. 14, 1999 (CH) ............................................. 1293/99

(51) Int. Cl.⁷ ........................ B23B 31/40; B23B 31/22
(52) U.S. Cl. .................... 279/2.09; 279/2.13; 279/2.16; 279/133; 279/143; 409/132
(58) Field of Search ............................. 279/2.06, 2.09, 279/2.11, 2.12, 2.13, 2.16, 143, 156; 409/174, 218; 269/309

(56) References Cited

U.S. PATENT DOCUMENTS

| | | | |
|---|---|---|---|
| 2,293,085 A | * 8/1942 | Stieber | 287/52.01 |
| 3,695,126 A | 10/1972 | Armstrong et al. | |
| 3,722,360 A | * 3/1973 | Blakey et al. | 90/11 C |
| 5,065,991 A | * 11/1991 | Schneider | 269/309 |
| 5,615,590 A | * 4/1997 | Speckhahn | 82/162 |
| 6,186,711 B1 | * 2/2001 | Mueller | 409/132 |
| 6,219,893 B1 | * 4/2001 | Nordquist | 29/33 P |

FOREIGN PATENT DOCUMENTS

| | | |
|---|---|---|
| DE | 2413778 | 10/1975 |
| DE | 3639871 | 6/1988 |
| DE | 3705123 | 9/1988 |

* cited by examiner

Primary Examiner—Henry Tsai
Assistant Examiner—Terrence Washington
(74) Attorney, Agent, or Firm—Tarolli, Sundheim, Covell, Tummino & Szabo L.L.P.

(57) ABSTRACT

The apparatus comprises a chuck member to be mounted within the operating area of the machine tool and a work piece carrier that can be put onto the chuck member and clamped thereto. First positioning members provided on the chuck member and second positioning members provided on the work piece carrier cooperate to define the position of the work piece carrier along three coordinate axes each running perpendicular to each other as well as with regard to the angular orientation. A clamping mechanism fixes the work piece carrier member to the chuck member in the afore mentioned defined position. In order to ensure an increased resistance against tilting momenta and torque occurring during the machining of a work piece, the first positioning members are constituted by conical centering pins and the second positioning members are constituted by recesses in the shape of a two-stage groove having two shoulders.

14 Claims, 4 Drawing Sheets

APPARATUS FOR CLAMPING A WORK PIECE

BACKGROUND OF THE INVENTION

The present invention refers to an apparatus for clamping a work piece in a well defined position within the operating area of a machine tool, comprising a chuck member adapted to be fixed within the operating area of the machine tool, a work piece carrier adapted to be fixed to the chuck member and to be clamped thereto, and a clamping mechanism for clamping the workpiece carrier to the chuck member.

Such an apparatus, well known in the art, primarily serves for clamping a work piece to be machined in the operating area of a machine tool with very high accuracy. It is particularly important that also the repetitive accuracy is ensured. In other words, the work piece received on the work piece carrier has to be clamped subsequently many times on a chuck member adapted to the work piece carrier and shall thereby have always a precisely defined position in X-direction, in Y-direction, in Z-direction and also regarding the angular orientation around the Z-axis, for example in circumstances if the work piece carrier bearing the work piece to be machined has to be clamped in different machine tools that subsequently perform different machining operations and are each equipped with an identical chuck member, or in measuring and test stations equipped with the same chuck member as well.

PRIOR ART

Such an apparatus is disclosed, for example, in the European Patent Nr. 0,255,042. That apparatus comprises two pairs of positioning strip members towering above the surface of the chuck member, equipped with contact surfaces for the orientation of the work piece carrier in X- and Y-directions. Moreover, four pins are provided also towering above the surface of the chuck member. These pins are responsible for defining the Z-position of the work piece carrier. The matching work piece carrier comprises a plane surface adapted to rest against the afore mentioned pins provided on the chuck member. Furthermore, the surface of the work piece carrier is provided with two pairs of grooves in a layout corresponding to the one of the afore mentioned positioning strip members. The grooves have flexible lips that are intended to rest against the contact surfaces of the afore mentioned strip members of the chuck member. Finally, the work piece carrier has a central aperture for receiving a pulling bolt member by means of which the clamping force required to maintain the defined position between work piece carrier and chuck member is transferred. Thereby, the chuck member comprises a centrally located ball lock mechanism cooperating with that pulling bolt member.

A disadvantage of such a known apparatus may be seen in the fact that it is relatively unstable, particularly if bigger and heavier, respectively, work pieces have to be machined. Thus, it cannot resist high tilting momenta or torque forces that can occur especially in the case of cutting operations. An increase of the size of the apparatus that would also increase the stability is not desired in many cases due to limited space availability.

OBJECTS OF THE INVENTION

Thus, it is an object of the present invention to provide an apparatus for clamping a work piece in a well defined position within the operating area of a machine tool in which the work piece carrier clamped to the chuck member and, thereby, the work piece to be machined has a substantially increased resistance against tilting momenta and torque forces, simultaneously avoiding the danger that the work piece carrier and, thereby, the work piece is displaced relative to the chuck member, all this by maintaining the desired small size and a very high accuracy as far as the positioning of the work piece carrier relative to the chuck member is concerned, particularly also in the case of repetitive clamping, as explained herein before.

SUMMARY OF THE INVENTION

In order to meet these and other objects, the invention provides an apparatus for clamping a work piece in a well defined position within the operating area of a machine tool, comprising a chuck member adapted to be fixed within the operating area of the machine tool, a work piece carrier adapted to be fixed to the chuck member and to be clamped thereto, and a clamping mechanism for clamping the workpiece carrier to the chuck member and adapted to be switched from a released condition to a clamping condition and vice versa.

The chuck member comprises first positioning members and the work piece carrier comprises second positioning members. The first and second positioning members cooperate such as to define the position of the work piece carrier relative to the chuck member along three coordinate axes each running perpendicular to each other, i.e. the X-axis, the Y-axis and the Z-axis, as well as with regard to the angular orientation around the Z-axis.

The clamping mechanism thereby fixes the work piece carrier to the chuck member once it is switched to the clamping condition to maintain the defined position.

The first positioning members are constituted by conical centering pins and the second positioning members are constituted by recesses in the shape of a two-stage groove. The groove has two shoulders whose edges protrude towards the interior of the groove. The mutual distance of these edges is somewhat less than the width of the conical centering pins, measured between those locations that touch these edges once the work piece carrier is clamped to the chuck member.

In order to even further increase the desired high resistance against unintentional positional changes caused by tilting and torque momenta occurring under heavy load, it is provided in a preferred embodiment that the centering pins are evenly distributed along the edge of the top surface of the chuck member, whereby at least the peripherally opposite lateral surfaces of the centering pins are inclined with regard to the Z-axis of the apparatus. Moreover, the first positioning members further comprise elevated surface portions located on the top surface of the chuck member and extending up to the edge thereof.

An even still further increased resistance to withstand high torque forces can be achieved if the recesses are machined into a shoulder provided in an upper portion of the work piece carrier, whereby the shoulder protrudes towards the interior of the hollow cylindrical work piece carrier, the location of the recesses corresponding to the location of the centering pins provided on the chuck member.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
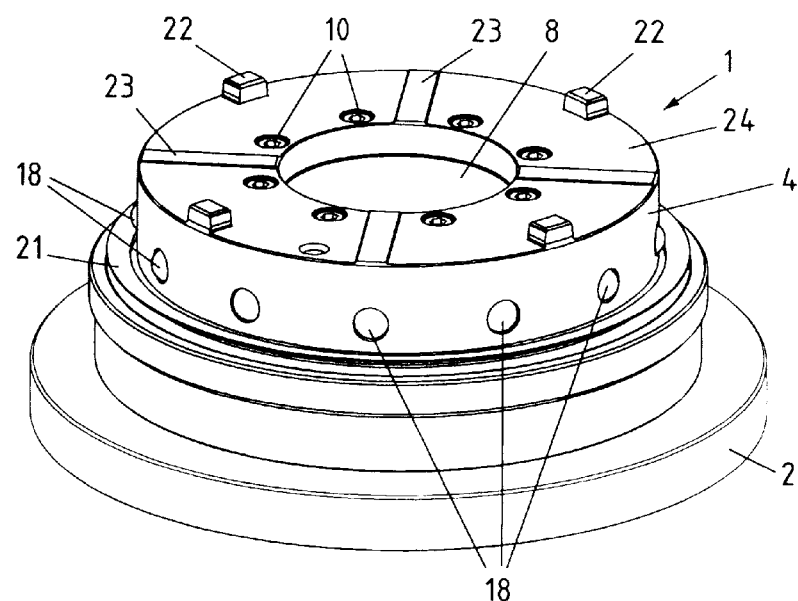
FIG. 1 shows a perspective view of a chuck member.
Figure 2:
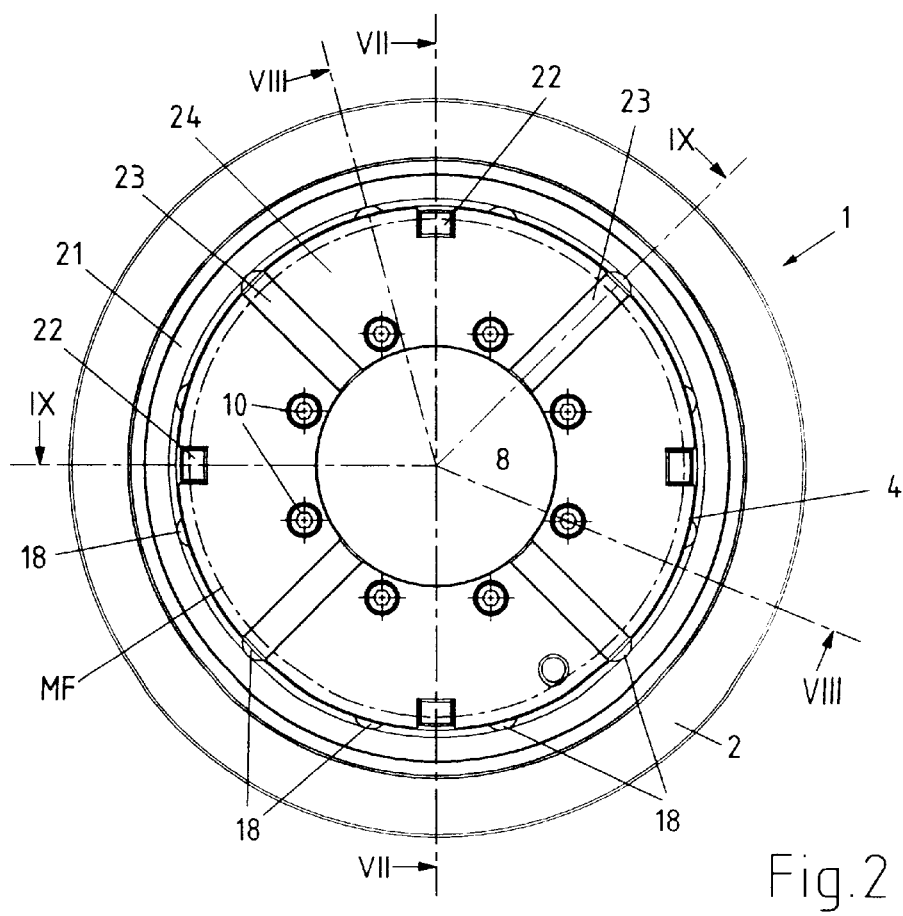
FIG. 2 shows a top view of the chuck member of FIG. 1.
Figure 3:
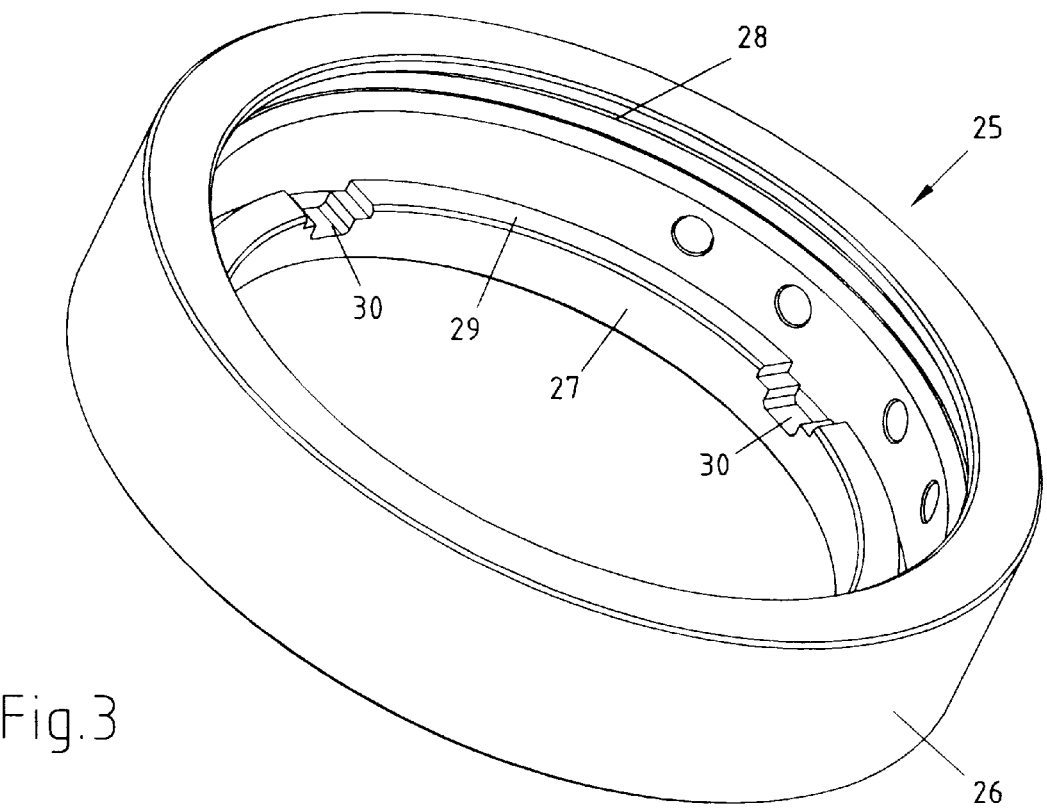
FIG. 3 shows a perspective view of a work piece carrier member.
Figure 4:
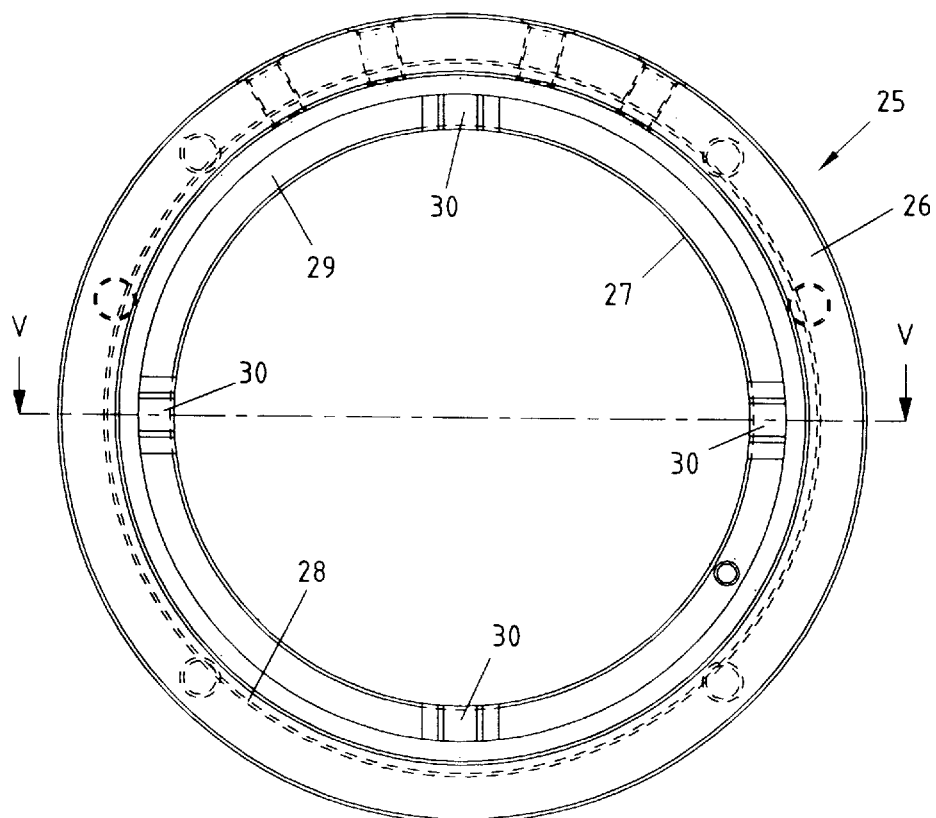
FIG. 4 shows a bottom view of the work piece carrier member of FIG. 3.
Figure 5:
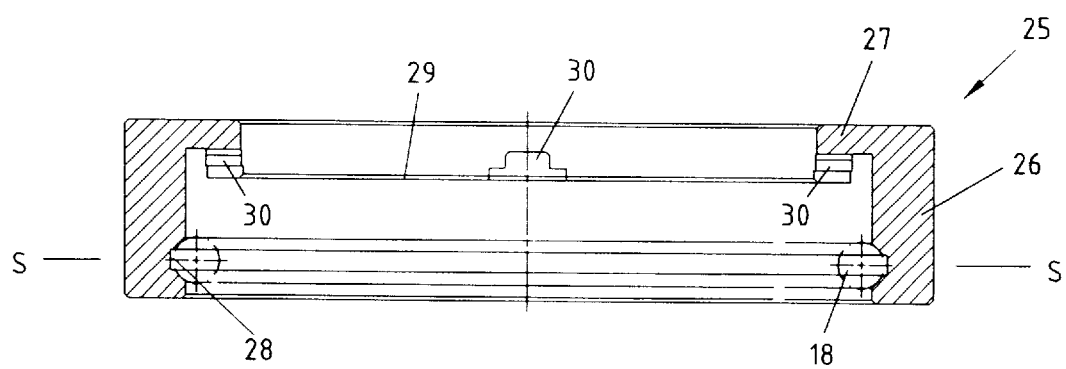
FIG. 5 shows a sectional view of the work piece carrier member of FIG. 4 taken along the line V—V in FIG. 4.

The apparatus for clamping a work piece in a well defined position within the operating area of a machine tool shown as an embodiment in the drawings comprises, on the one hand, a chuck member, generally designated with reference numeral 1 and shown in FIGS. 1, 2 and 7–9, and, on the other hand, a work piece carrier member, generally designated with reference numeral 25 and shown in FIGS. 3–5. While the chuck member is essentially adapted to be fixed within the operating area of a machine tool (not shown in the drawings), the work piece carrier member 25 serves for receiving and holding a work piece to be machined. It should be emphasized that the expression "work piece" shall be understood in a general sense; particularly, a work piece could also be a tool to be machined, for example an electrode for an electro erosive machining device.

Figure 7:
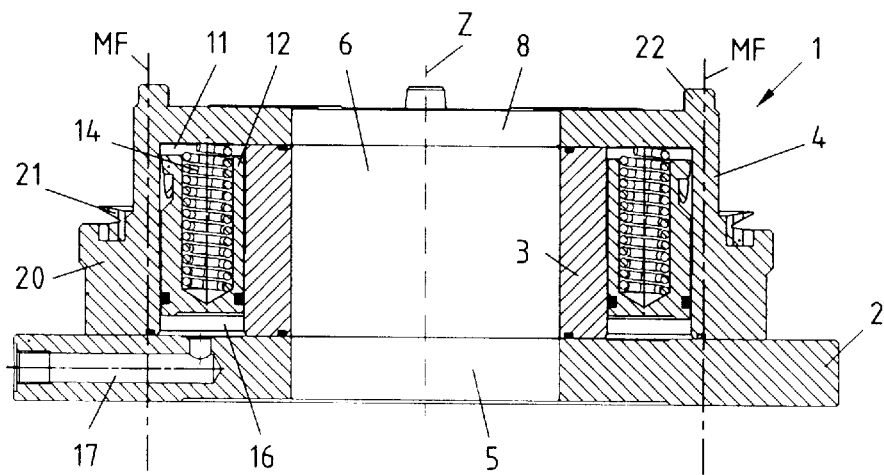
FIG. 7 shows a sectional view of the chuck member of FIG. 1 taken along the line VII—VII in FIG. 2.
Figure 8:
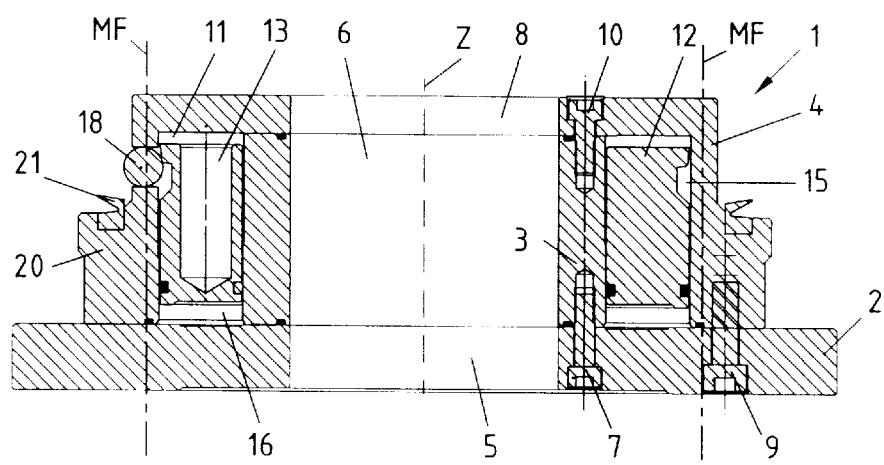
FIG. 8 shows a sectional view of the chuck member of FIG. 1 taken along the line VIII—VIII in FIG. 2.
Figure 9:
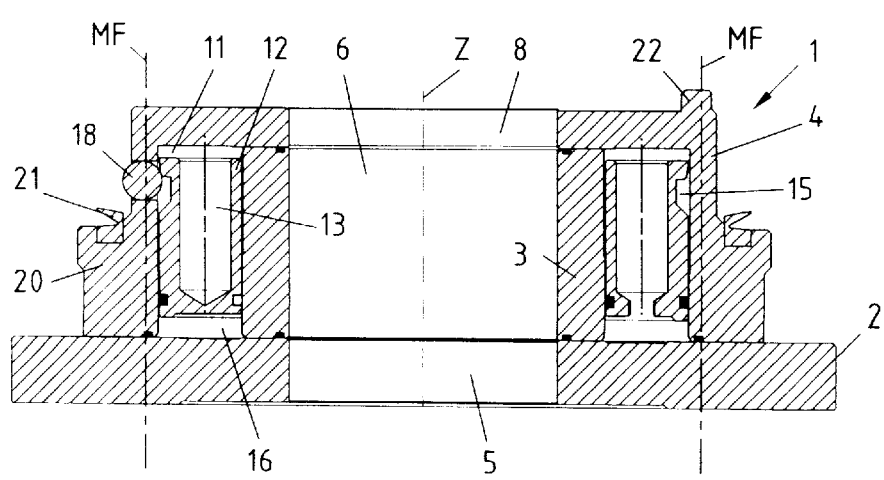
FIG. 9 shows a sectional view of the chuck member of FIG. 1 taken along the line IX—IX in FIG. 2.

As can be seen particularly in FIGS. 7–9, the chuck member 1 essentially comprises three portions, i.e. a base portion or base element 2, an intermediate portion 3 and a head portion 4. In the embodiment shown in the drawings, the base element 2 has the shape of a circular disc or plate member provided with a central aperture 5; the purpose of that aperture will be explained further herein after. The intermediate portion 3 is provided with a central aperture 6 having the same diameter as the aperture 5 and has the shape of a cylindrical or tube-like element. It is connected to the base element 2 by means of screws 7. Finally, the head portion 4 has a central aperture 8 as well, again with the same diameter as the apertures 5 and 6. It has essentially pot-like or hat-like shape with an inner diameter that is greater than the outer diameter of the intermediate portion 3. The head portion, on the one hand, is connected to the base element 2 by means of screws 9 and, on the other hand, is connected to the intermediate portion 3 by means of screws 10. Finally, the head portion 4 is provided with an outer peripheral shoulder 20. Inserted into the top surface of that shoulder 20 is a sealing member 21.

By virtue of the afore mentioned design, an extremely stiff and flexurally rigid chuck housing is realized that moreover can be easily disassembled, for example for maintenance reasons.

The upper surface 24 of the head portion 4 is provided with four protruding centering pins 22 that have essentially prismatic shape and that are located evenly distributed along the edge region of the upper surface 24 of the head portion 4. Two opposite centering pins 22 define the extension of the X-axis, while the remaining two opposite centering pins 22 define the extension of the Y-axis running perpendicularly to the X-axis. The point of intersection of the X-axis and the Y-axis defines the Z-axis (FIG. 7–9) running perpendicularly both to the X-axis and the Y-axis. As will be further explained herein after, at least the two peripherally opposite lateral surfaces of the centering pins 22 are somewhat inclined with regard to the Z-axis.

Moreover, the top surface 24 of the head portion 4 is provided with four plane surface portions 23 each of them extending, in the present embodiment, radially between two adjacent centering pins 22. The surface portions 23 slightly tower above the top surface 24 of the head portion 4. These surface portions 23 serve as Z-references, as will be further explained herein after.

The design of the work piece carrier 25 is shown in FIGS. 3–5. As can be seen particularly in FIGS. 3 and 5, the one-piece work piece carrier 25 comprises a peripheral portion 26 having essentially cylindrical or tube-like shape as well as an annulus-shaped top portion 27. The inner diameter of the peripheral portion 26 essentially corresponds to the outer diameter of the head portion 4 of the chuck member 1, of course with a reasonable clearance such that the work piece carrier 25 can be put onto the chuck member 1.

The inner wall of the peripheral portion 26 of the work piece carrier 25 is provided with a circular groove 28, whereby the two side walls of the circular groove 28 extend conically away from each other as seen in a direction towards the interior of the peripheral portion 26. In other words, the circular groove 28 has an essentially V-shaped cross section. The purpose and function of this circular groove 28 will be further discussed herein after.

The upper portion 27 of the work piece carrier 25 is provided with an annulus-shaped shoulder 29 protruding towards the interior of the peripheral portion 26. Thereby, the mean diameter of this shoulder 29 essentially corresponds to the diameter of the circle a long which the four centering pins 22 provided on the head portion 4 of the chuck member 1 are located. The front surface of that shoulder 29 that protrudes towards the interior of the peripheral portion 26 of the work piece carrier 25 is smoothly plane ground and serves as a Z-reference of the work piece carrier 25. It is adapted to cooperate with the afore mentioned plane surface portions 23 provided on the top surface 24 of the head portion 4 of the chuck member 1. Moreover, the aforementioned front surface is provided with four recesses 30 evenly distributed along the periphery of that front surface. The exact design of these recesses will be further explained herein after. Anyway, these four recesses 30 are adapted to cooperate with the afore mentioned four centering pins 22 provided on the top surface 24 of the head portion 4 of the chuck member 1.

Even if four centering pins 22 and four recesses 30 cooperating therewith are shown and described in the present example, it is understood that it is also possible to provide three, six, eight or a greater number, being a mathematical sub-set of a Hirth gearing, of centering pins 22 and recesses 30 in order to ensure the positioning of the work piece carrier 25 with regard to the chuck member 1 in X- and Y-directions as well as regarding the angular orientation.

Figure 6:
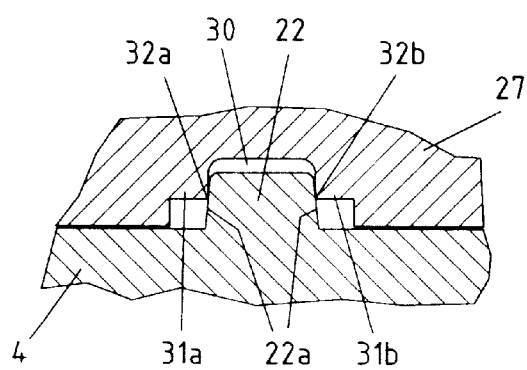
FIG. 6 shows a schematical partial sectional view of a centering aperture and a centering pin in an enlarged scale.

FIG. 6 shows a schematical partial sectional view of a centering recess 30 and a centering pin 22 in an enlarged scale. The recess 30 is designed as a two stage groove and comprises two shoulders 31a and 31b. As already mentioned before, the centering pins 22 are slightly conical by the fact that at least the two peripherally opposite lateral surfaces of the centering pins 22 are somewhat inclined with regard to the Z-axis. In practice, the angle of inclination can be in the region of between 3° and 9°. The edges 32a and 32b of the shoulders 31a and 31b protruding towards the interior of the groove 30 are authoritative for the definition of the position of the work piece carrier 25 with regard to the chuck member 1 in X- and Y-direction as well as regarding the angular orientation. Thus, the distance between these edges 32a and 32b is somewhat less than the width of the conical centering pin 22 engaging that recess 30, measured between the contact points or lines of the two opposite lateral surfaces of the pin 22 when the work piece carrier 25 is firmly clamped to the chuck member 1.

The mutual dimensions of the work piece carrier 25 and the chuck member 1 are chosen such that the following consequence results:

If the work piece carrier 25 is loosely laid onto the chuck member 1, the centering pins 22 engage the corresponding centering recesses 30, whereby the lateral surfaces 22a of the centering pins 22 get into line contact with the edges 32a and 32b, respectively, of the shoulders 31a and 31b, respectively. In this condition, the plane ground end surface of the shoulder 29 of the work piece carrier 25, serving as the Z-reference of the carrier 25, does not yet abut against the plane surface portions 23 provided on the head portion 4 of the chuck member 1, towering somewhat above its top surface and serving as the Z-reference of the chuck member 1. Rather, in this situation, there is a gap between the end surface of the shoulder 29 and the surface of the portions 23 with a width of some 1/100 of a millimeter. On the other hand, and this fact has to be emphasized, the position of the work piece carrier 25 with regard to the chuck member 1 in X- and Y-directions as well as regarding the angular orientation is finally set.

Once the work piece carrier 25 is loosely laid onto the chuck member 1 and finally positioned with regard to the X- and Y-directions as well as with regard to its angular orientation, the clamping mechanism, to be described in the following, is operated such that the work piece carrier 25 is pulled against the chuck member 1, in practice with a force in the region of between 2000 and 3000 Newtons. Under the influence of this clamping force acting in Z-direction, the shoulders 31a and 31b, respectively, are elastically deformed in the region of their edges 32a and 32b, respectively, particularly to such an extent until the end surface of the shoulder 29 of the work piece carrier 25 abuts against the slightly elevated surface portions 23 of the head portion 4 of the chuck member 1. The result is that the work piece carrier 25 is exactly positioned with regard to the chuck member 1 in Z-direction as well.

The clamping force required for clamping the work piece carrier 25 against the chuck member 1 is created in the present embodiment as follows:

By virtue of the already mentioned fact that the inner diameter of the head portion 4 is larger than the outer diameter of the intermediate portion 3, a circular chamber 11 is created between these two portions 3 and 4. The circular chamber 11 is sealed by means of suitable sealing elements indicated in the drawings (cf. FIGS. 7–9), but not referenced in detail. In the interior of this circular chamber 11, a circular piston 12 is received in such a manner that it can be moved along the central axis Z of the chuck member 1. The circular piston 12 is provided with a plurality of blind holes 13 that are evenly distributed along its circumference and that are adapted each to receive a tensioning or clamping spring 14.

The springs 14 rest against the bottom surface of the head portion 4 and bias the circular piston 12 to move downwards. Moreover, the circular piston 12 is provided with an outer peripheral groove 15. The lower lateral wall of that groove 15 slopes outwardly downwards. That groove 15 serves for partially receiving a plurality of clamping ball members 18.

Below the circular piston 12, there is provided a hollow circular chamber 16 communicating with a connecting bore 17 provided in the base element 2. By means of this connecting bore 17, the circular chamber 16 can be filled with pressurized air, acting on the circular piston 12 and moves the latter one upwards against the pressure of the springs 14.

The head portion 4 is provided with a plurality of radially extending bores 19 having a diameter that essentially corresponds to the diameter of the clamping ball members 18 and serving for receiving these clamping ball members 18. The height level of these bores 19 and the height level of the afore mentioned peripheral groove 15 are in such a relation that the clamping ball members 18 inserted into the bores 19 can enter the peripheral groove 15 if the circular piston 12, under the influence of the pressurized air in the circular chamber 16 and against the force of the springs 14, is moved in its topmost position. Thereby, the clamping balls 18 can penetrate the peripheral groove 15 to such an extent that the clamping balls no longer tower above the outer periphery of the head portion 4.

The axial position of the circular groove 28, i.e. the height level with reference to the Z-axis, is defined such that the clamping balls 18, schematically indicated in FIG. 5, can penetrate the groove 28 if the work piece carrier is loosely laid onto the chuck member 1. In this situation, the clamping balls 18 are somewhat axially offset downwardly with regard to the axially extending symmetry plane S—S of the circular groove 28. In other words: If the work piece carrier 25 is loosely laid onto the chuck member 1, the afore mentioned symmetry plane S—S of the circular groove 28 is located somewhat above the center of the balls 18 inserted into the bores 19 of the intermediate portion 3 of the chuck member 1.

The axial position of the circular groove 28 in the work piece carrier 25 is located in such a way that the clamping balls 18 of the chuck member 1 can penetrate the groove 28 if the work piece carrier 25 is loosely laid onto the chuck member 1, whereby the symmetry plane S—S of the circular groove 28 is located somewhat above the centers of the clamping balls 18 inserted into the radially extending bores 19 of the intermediate portion 3 of the chuck member 1. On the other hand, in order to enable the work piece carrier 25 to be loosely laid onto the chuck member 1, the clamping balls 18 of the chuck member 1 have to be in their retracted position. This is accomplished (cf. FIGS. 7–9) by feeding pressurized air into the circular chamber 16 below the circular piston 12, with the result that the circular piston 12 is forced to an upward movement against the pressure of the springs 14. Thus, the peripheral groove 15 provided in the circular piston 12 is moved into a position where it is aligned with the clamping balls 18 such that the latter ones can penetrate the groove 15 and do not tower above the surface of the intermediate portion 3 of the chuck member 1.

After the work piece carrier member 25 having been laid onto the chuck member 1 and is positioned in X- and Y-directions as well as regarding its angular orientation, the overpressure in the circular chamber 1 is removed with the result that the circular piston 12 is moved downwards under the influence of the force exerted by the springs 14. Thus, the clamping balls 18 are pressed into the circular groove 28 of the work piece carrier 25. Due to the afore mentioned slightly asymmetric rest position between clamping balls 18 and circular groove 28 and due to the V-shaped design of the circular groove 28, as seen in a cross sectional view, the work piece carrier 25 is pulled against the chuck member 1 such that, as has already been mentioned, the end surface of the shoulder 29 of the work piece carrier 25 abuts against the slightly elevated surface portions 23 of the head portion 4 of the chuck member 1. The result is that the work piece carrier 25 is exactly positioned with regard to the chuck member 1 in Z-direction as well and the clamping operation is finished.

From these explanations, it is evident that the clamping force acting parallel to the Z-direction is transferred by means of the clamping balls 18 to the work piece carrier 25 to clamp the latter one against the chuck member 1, particularly, in the present example, at twelve locations evenly distributed along the periphery of the intermediate portion 3 of the chuck member 1. In other words, the entire clamping force acting onto the work piece carrier 25 is summed up of twelve individual clamping force components each transferred by one of the twelve clamping balls 18. Thereby, the lines of activity of these clamping force components are located on a cylindrical nappe MF (cf. FIGS. 2, 5 and 7–9) that runs, depending on the chosen dimensioning of chuck member 1 and work piece carrier 25 as well as depending on the exact position of the centering pins 22, the recesses 30 and the end surface of the shoulder 29, through these elements 22, 30 and 29, i.e. intersects these elements, or runs immediately next to these elements, preferably slightly outwards thereof. Thereby, it is ensured that the clamping force acts exactly at those locations where it is really required, with the consequence that the flexural stress present in the work piece carriers of the prior art is drastically reduced and entirely avoided, respectively. Moreover, tilting momenta occurring during the machining of a work piece are much better absorbed than in the case of a work piece carrier of the prior art with a central clamping device.

It is understood that the circular piston 12 can be operated, instead by means of pressurized air, also hydraulically.

The final shaping of the recesses 30 of the work piece carrier 25 preferably is performed by plastic deformation, for example by stamping. Thereby, a very high accuracy can be achieved, even in series production. The massive centering pins 22 having slightly sloped lateral surfaces ensure, in cooperation with the recesses 30, that even very high torques can be transmitted.

To the stability and the rigidity of the system chuck member/work piece carrier in the clamped condition contributes also the circumstance that the work piece carrier, including its centering elements in X-, Y-, Z- and angular directions, is of a one piece construction. By virtue of the essentially pot- or hat-like shape of the work piece carrier 25, the essential parts and elements of the chuck member 1 are enclosed once the system is in operation, whereby particularly the centering elements 22, 23 and 30 are well protected against contamination. Such protection is even improved by the provision of the sealing member 21 (cf. FIGS. 7–9) located at the top side of the shoulder 20, against which the lower end surface of the peripheral portion 26 of the work piece carrier 25 rests.

The provision of the central apertures 5, 6 and 8, respectively, in the base element 2, in the intermediate portion 3 and in the head portion 4, respectively, in connection with the generally annular shaped design of the work piece carrier 25, enable also elongate work pieces to be clamped and machined. For example, the turbine blades of turbine rotors can be received in the afore mentioned apertures in order to machine the so-called "fir tree" of the turbine blades.

If one can go without the afore mentioned central openness of the clamping system according to the present invention, it is possible to provide an additional central clamping mechanism in order to further increase the clamping force exerted to the work piece carrier, or to provide a further, independent clamping system known in the prior art, for example to clamp smaller work pieces.

What is claimed is:

1. An apparatus for clamping a work piece in a well defined position within the operating area of a machine tool, comprising:

a chuck means adapted to be fixed within the operating area of the machine tool;

a work piece carrier means adapted to be fixed to said chuck means and to be clamped thereto;

clamping means for clamping said work piece carrier means to said chuck means and adapted to be switched from a released condition to a clamping condition and vice versa;

said chuck means comprising first positioning means and said work piece carrier means comprising second positioning means, said first and second positioning means being adapted to cooperate such as to define the position of said work piece carrier means relative to said chuck means along three coordinate axes each running perpendicular to each other as well as with regard to the angular orientation;

said clamping means fixing said work piece carrier means to said chuck means once it is switched to said clamping condition to maintain said defined position;

said first positioning means comprising conical centering pin means and said second positioning means comprising recess means in the shape of a two-stage groove means having two shoulder means, the edges of said shoulder means protruding towards the interior of said groove means and being separated by a distance that is less than the width of said conical centering pin means, measured between those locations that touch said edges once said work piece carrier means is clamped to said chuck means such that a clamping force provided by said clamping means elastically deforms said edges of said shoulder means to enable a surface of said work piece carrier to abut against elevated surface portions of said chuck means.

2. An apparatus according to claim 1 in which said centering pin means are evenly distributed along the edge of the top surface of said chuck means, whereby at least the peripherally opposite lateral surfaces of said centering pin means are inclined with regard to the Z-axis of the apparatus.

3. An apparatus according to claim 2 in which the angle of inclination of said lateral surfaces of said centering pin means amounts to between 3° and 9°.

4. An apparatus according to claim 1 in which said elevated surface portion means are located on the top surface of said chuck means.

5. An apparatus according to claim 1 in which said chuck means is of essentially cylindrical shape and said work piece carrier means essentially has the shape of a hollow cylinder that is covered at one end by an essentially annulus-shaped plate member, such that said chuck means is enclosed by said work piece carrier means once the apparatus is in its clamped condition.

6. An apparatus according to claim 1 in which said recess means are machined into a shoulder means provided in an upper portion of said work piece carrier means, said shoulder means protruding towards the interior of said hollow cylindrical work piece carrier means, whereby the location of said recess means corresponds to the location of said centering pin means provided on said chuck means.

7. An apparatus according to claim 1 in which said second positioning means further comprise plane machined surface portion means of said shoulder means provided on said work piece carrier means, said surface portion means being adapted to rest against said elevated surface portion means provided on the top surface of said chuck means.

8. An apparatus according to claim 1 in which both said chuck means and said work piece carrier means have central aperture means for receiving elongate work pieces.

9. An apparatus according to claim 1 in which said clamping means comprises peripherally acting clamping device means with a plurality of clamping ball means evenly distributed along the periphery of said chuck means, and said work piece carrier means comprising a circular groove means located at its inner cylindrical surface, said clamping ball means being adapted to cooperate with said circular groove means.

10. An apparatus according to claim 9 in which said chuck means comprises a circular chamber means and said clamping means comprises a circular piston means biased by spring means and being axially movably mounted in said circular chamber means, said clamping ball means resting against said circular piston means, whereby said circular piston means is adapted to press said clamping ball means into said circular groove means provided in said work piece carrier means once said circular piston means is axially moved.

11. An apparatus according to claim 9 in which said clamping ball means are received in radially extending bores provided in said chuck means and evenly distributed along its periphery.

12. An apparatus according to claim 9 in which said clamping device means comprises twelve clamping ball means.

13. An apparatus according to claim 9 in which said circular groove means provided in said work piece carrier means is of essentially V-shaped cross section.

14. An apparatus according to claim 9 in which the axial location of said circular groove means provided in said work piece carrier means is defined such that said clamping ball means can penetrate said circular groove means provided in said work piece carrier means when said work piece carrier means is loosely laid onto said chuck means, whereby the plane of symmetry of said circular groove means provided in said work piece carrier means is located slightly above the centers of said clamping ball means inserted into said radially extending bores.

* * * * *